United States Patent Office 3,793,261
Patented Feb. 19, 1974

3,793,261
PROCESS FOR PREPARING PETROLEUM RESIN
Shigeru Katayama, Iwakuni, Kinya Mizui, Ohtake, and Katsuhiko Tasaka, Iwakuni, Japan, assignors to Mitsui Petrochemical Industries, Ltd., Tokyo, Japan
No Drawing. Filed Sept. 27, 1971, Ser. No. 184,290
Claims priority, application Japan, Oct. 2, 1970, 45/85,845
Int. Cl. C08f 15/42
U.S. Cl. 260—82
10 Claims

ABSTRACT OF THE DISCLOSURE

Process for preparing petroleum resin which comprises polymerizing a by-product hydrocarbon fraction in petroleum refining, cracking, etc. containing five carbon atoms boiling at temperatures in the range from 30° to 45° C., mainly composed of $C_5$ unsaturated hydrocarbons, at a temperature of from 70° C. to 120° C. in an aromatic hydrocarbon solvent in the presence of an aluminum chloride catalyst of a particle size such that it passes through a 100 Tyler mesh screen.

BACKGROUND OF THE INVENTION (1) Field of the invention

This invention relates to a process for preparing petroleum resins suitable for improving the tackiness of rubber without by-production of gel using as the starting material a by-product fraction in petroleum refining, cracking, etc. mainly composed of unsaturated hydrocarbons containing five carbon atoms (hereinafter referred to as the $C_5$ fraction).

(2) Description of the prior art

A process is known for the preparation of slightly colored petroleum resins with high softening points by polymerizing a fraction which is obtained in the steam cracking of petroleum, boils at temperatures in the range from 30° to 60° C. and contains piperilene in an aliphatic hydrocarbon solvent using an aluminum chloride catalyst having particle sizes such that they pass through a 20 mesh screen. The preparation is carried out at a temperature from −30° to +70° C. However, due to the use of an aluminum chloride catalyst which, although powdered, if of considerably large particle size and the use of the aliphatic hydrocarbon solvent, the process is associated with the by-production of gels during the polymerization with result that the fraction boiling in the range from 30° to 60° C., that is the starting fraction is not efficiently utilized. Moreover, the petroleum resin obtained by the process, when incorporated in rubber, is almost ineffective in improving the tackiness.

SUMMARY OF THE INVENTION

The present invention, with the object of overcoming the above mentioned difficulties, is concerned with processes for preparing petroleum resins which comprises polymerizing a $C_5$ fraction, obtained, for example as a by-product hydrocarbon fraction in petroleum refining, cracking, etc. containing fve carbon atoms boiling at temperatures in the range from 30° to 45° C. mainly composed of unsaturated hydrocarbons having the same carbon atoms, in an aromatic hydrocarbon solvent in the presence of aluminum chloride particles of a particle size such that they pass through a 100 Tyler mesh screen at a temperature from 70° to 120° C.

DESCRIPTION OF THE INVENTION

The $C_5$ fraction used in the process of the invention is a hydrocarbon fraction boiling at temperatures in the range from 30° to 45° C. under ordinary pressure which is obtained as a by-product in petroleum refining, cracking, etc. and contains principally $C_5$ unsaturated hydrocarbons. As the unsaturated hydrocarbons contained are mentioned 1-pentene, 2-pentene, isoprene, 1,3-pentadiene, cyclopentadiene and the like. The content of cyclopentadiene is preferably less than 10% by weight. In addition, hydrocarbons containing four or six carbon atoms may also be included in the fraction.

The aluminum chloride catalyst prior to introduction into the reaction system should have small particle sizes that pass through a 100 Tyler mesh screen. If such larger particle sizes that do not pass a 100 Tyler mesh screen are employed there results marked by-production of gels associated with a low yield of petroleum resin per unit weight of the catalyst. The smaller the particle size the better will be the result, use of the powders with particle sizes passing through a 150 Tyler mesh screen being preferred.

The aluminum chloride catalyst is conveniently employed in suspension in an aromatic hydrocarbon solvent. Although it may also be employed in the form of complex compound with toluene and hydrogen chloride, the petroleum resin thereby obtained is poor in color so that the complex compound is eliminated from the scope of the invention.

Other Friedel-Crafts catalysts are not generally preferred because petroleum resins of low softening point are produced in low yields.

The aluminum chloride catalyst is usually used in an amount from 0.5 to 3.0 parts by weight, preferably from 0.8 to 1.5 parts by weight per 100 parts by weight of the $C_5$ fraction. The use of smaller amounts will result in reduced yield and softening point of the petroleum resin, whereas larger amounts will deteriorate the color.

Aromatic hydrocarbon solvents used in the present invention include benzene, toluene, xylene, ethylbenzene and mixtures thereof. The amount of solvent employed ranges from 5 to 100 ml. per 100 g. of the $C_5$ fraction. It is preferred to use 30–100 ml. with benzene, 10–50 ml. with toluene and 5–30 ml. with xylene. Smaller amounts will be associated with by-production of solvent-insoluble gels, whereas larger amounts will result in decrease in the yield and softening point of petroleum resin. When no solvent or an aliphatic hydrocarbon solvent is employed, a large amount of gel is produced, and this is undesirable from an operational point of view. Use of an alicyclic hydrocarbon, for example cyclohexane, as the solvent produces a petroleum resin of a lower softening point, though the by-production of gel is low.

When a polymerization is conducted using as the solvent toluene or xylene the smaller the amount of solvent used the higher will be the softening point, nevertheless products with a softening point over 100° C. cannot be reproducibly obtained. On the other hand, it has been found that use of ethylbenzene, or the same containing an aromatic hydrocarbon as the solvent affords petroleum resin having a desired softening point above 100° C. in a high yield. Therefore, in carrying out production of petroleum resin according to this invention from a by-product hydrocarbon fraction in petroleum refining, cracking, etc. of 5 carbon atoms containing unsaturated hydrocarbons by polymerization at a temperature of 70°–120° C., preferably of 90°–115° C. using an aluminum chloride catalyst, it is an advantage of the process according to this invention that production of petroleum resin with any high and desired softening point is feasible by conducting the polymerization in the presence of an ethylbenzene solvent in an amount from 3 to 30% by weight of the $C_5$ hydrocarbon fraction. When ethylbenzene is used as the solvent it may contain other alkylbenzenes provided that the content of the latter is below 25% by weight.

The amount of ethylbenzene used will usually be varied from 3 to 30% by weight, preferably from 5 to 25% by weight of the $C_5$ fraction, depending upon composition of the $C_5$ fraction, the polymerization temperature or the like. The use of less than 3% by weight tends to deteriorate the color of the petroleum resin and the use of over 30% by weight results in reduction of softening point of the resin.

The polymerization temperature is usually in the range of 70°–120° C. and preferably in the range of 90°–115° C. Yield of the petroleum resin will be reduced at temperatures below 70° C. simultaneously with decreases in the tackiness on incorporating the resin into rubber. Polymerization at a temperature above 120° C., on the other hand, will produce petroleum resins of poor color and lower softening point which do not improve the tackiness of rubber when incorporated therein.

The process of the present invention can be easily conducted by combination of conventional polymerization procedures wherein the $C_5$ fraction and ethylbenzene are placed in a polymerization vessel and aluminum chloride is added thereto while maintaining the predetermined temperature and conventional after-treatment procedures wherein aqueous alkali or water is added to the polymerization product to remove the catalyst and then unpolymerized matter and lower polymer are removed by distillation. The resulting petroleum resin has a softening point from 80° to 120° C., a Gardner color index from 8 to 13 and a bromine number from 20 to 40. Polymerization time is usually from 30 minutes to 4 hours but is not limited thereto.

The petroleum resins of the invention is advantageous in that they produce remarkable improvements in tackiness of rubber when incorporated into natural or synthetic rubber. Additionally, they are not contaminated with by-production of gel during polymerization.

DESCRIPTION OF PREFERRED EMBODIMENTS

The following examples illustrate the invention. In the examples composition of the $C_5$ fraction is expressed in percent by weight and yield of the petroleum resin is calculated on the basis of the weight of the $C_5$ fraction charged. Physical properties of the petroleum resin were measured by the following methods:

Softening point, ASTM E–67T;
Color index, ASTM D–1544–58T;
Bromine number, ASTM D–1158–59T.

Tackiness of the rubber is measured by the following procedures: Into a rubber were incorporated the petroleum resin and other additives at a proportion given below and the resulting blend was thoroughly kneaded on an open roll to prepare a sheet 1.5 mm. in thickness. Three hours after the preparation of the sheet, tackiness was measured at 10 positions on the sheet using a tackmeter of the pick-up type. The tackiness in the table below is an average of the values on 8 points except the highest and the lowest ones.

Proportion incorporated in part by weight:
Rubber _____ 100
Petroleum resin _____ 8
Zinc oxide _____ 5
Stearic acid _____ 2
Carbon black _____ 55
Naphthene oil _____ 5
Vulcanization accelerator _____ 1.2
Sulfur _____ 2

EXAMPLE 1; REFERENCE EXAMPLE 1

To 100 ml. of a benzene suspension containing 2.0 g. of powdered aluminum chloride passing through a 100 mesh screen placed in an autoclave were added dropwise 200 g. of a $C_5$ fraction obtained by petroleum cracking boiling at 30° —45° C. under ordinary pressure (composed of 27.3% by weight of $C_5$ olefin, 39.8% by weight of $C_5$ diolefin, and 32.9% by weight of $C_5$ paraffin and others) in the course of 8 minutes with stirring followed by polymerization at 75° C. for 3 hours in total. There was no gel by-produced during the polymerization. To the resulting polymerized oil were added 100 ml. of a 5% aqueous solution of sodium hydroxide to decompose the catalyst followed by repeated washing with water. The oil thus obtained was concentrated to yield 104 g. of a petroleum resin. The petroleum resin thus obtained had a softening point of 98° C., a color index of 8 and a bromine number of 35.

Into a styrene-butadiene rubber (grade 1502 manufactured by Japan Synthetic Rubber Co., Ltd.) was added the petroleum resin together with other additives in the proportion cited above and the rubber blend was measured for tackiness prior to vulcanization. The results, together with those in the following reference Examples 1–3, are shown in Table 1.

Reference Example 1 indicates tackiness prior to vulcanization of the rubber blend with additives other than the petroleum resin incorporated in the same way as in Example 1.

REFERENCE EXAMPLE 2

A petroleum resin was prepared in the same way as in Example 1 except that aluminum chloride of particle sizes passing through a 60 Tyler mesh screen but not through a 100 Tyler mesh screen was used. Gel was by-produced during the polymerization and the petroleum resin was obtained in a low yield.

The petroleum resin was incorporated into rubber in the same way as in Example 1 and the rubber blend was measured for tackiness. It was established that the petroleum resin was not useful as a tackifier for rubber.

REFERENCE EXAMPLE 3

A petroleum resin was prepared in the same way as in Example 1 except that heptane was used in place of the benzene. Gel was by-produced during the polymerization and yield of the petroleum resin was low.

The petroleum resin was incorporated into rubber in the same way as in Example 1 and the rubber blend was measured for tackiness. It was found that the petroleum resin was not useful as a tackifier for rubber.

TABLE 1

| | Particle size of catalyst (mesh) | Solvent | Yield (wt. percent) | | Petroleum resin | | | Tackiness of rubber blend (g.) |
|---|---|---|---|---|---|---|---|---|
| | | | Petroleum resin | Gel | Softening point (°C.) | Color index | Bromine number | |
| Example 1 | 100 | Benzene | 52 | Min. | 98 | 8 | 35 | 1,000 |
| Reference: | | | | | | | | |
| Example 1 | | | With no petroleum resin incorporated | | | | | 10 |
| Example 2 | 60–100 | Benzene | 44 | 6 | 91 | 9 | 30 | 430 |
| Example 3 | 100 | Heptane | 34 | 11 | 87 | 9 | 28 | 370 |

EXAMPLE 2

To 30 ml. of an ethylbenzene suspension containing 2.0 g. of powdered aluminum chloride passing through a 100 Tyler mesh screen placed in an autoclave were added dropwise 100 g. of the same $C_5$ fraction as in Example 1 in the course of 8 minutes with stirring followed by polymerization at 115° C. for 3 hours in total. Almost no gel was by-produced during the polymerization. After treatment conducted in the same way as in Example 1 yielded a petroleum resin.

REFERENCE EXAMPLES 4 AND 5

A petroleum resin was prepared in the same way as in Example 2 except that the polymerization was carried out at a temperature of 60° C. or 130° C. instead of 115° C.

Although only a small amount of gel was produced, the petroleum resin thus obtained was not useful as a tackifier for rubber.

TABLE 2

| | Polymerization temperature (° C.) | Yield (wt. percent) | | Petroleum resin | | | Tackiness of rubber blend (g.) |
| --- | --- | --- | --- | --- | --- | --- | --- |
| | | Petroleum resin | Gel | Softening point (° C.) | Color index | Bromine number | |
| Example 2 | 115 | 53 | Min. | 101 | 10–11 | 38 | 1,000 |
| Reference: | | | | | | | |
| Example 4 | 60 | 51 | Min. | 103 | 8 | 24 | 520 |
| Example 5 | 130 | 52 | Min. | 87 | 13 | 43 | 670 |

EXAMPLE 3

In a 300-ml. four-necked flask equipped with a stirrer, thermometer, inlet for the addition of catalyst and reflux condenser were placed 13 parts by weight of ethylbenzene and 100 parts by weight of a cracked oil composed of 28.5% by weight of a $C_5$ olefin, 31.4% by weight of a $C_5$ diolefin and 40.1% by weight of a $C_5$ paraffin, and others, which was substantially free of aromatic hydrocarbon. While maintaining the temperature at 75° C. 1.0 part by weight of aluminum chloride (passing through a 100 Tyler mesh screen) was added to the flask in the course of 10 minutes followed by polymerization for 3 hours. To the resulting polymerized oil were added aqueous alkali and water for washing to remove the catalyst. Then, vacuum distillation was conducted at a temperature of 200° C. and an absolute pressure of 100 mm. Hg to yield a petroleum resin. Yield, softening point and color index of the petroleum resin are shown in Table 3.

Into a styrene-butadiene rubber (grade 1502 manufactured by Japan Synthetic Rubber Co., Ltd.) was incorporated the petroleum resin together with other additives in the proportion cited above and the rubber blend was measured for tackiness prior to vulcanization. The result, with that in the following Reference Example 6, is shown in Table 3.

Reference Example 6 indicates tackiness prior to vulcanization of a rubber blend with additives other than the petroleum resin incorporated in the same way as in Example 3.

TABLE 3

| | Solvent (parts by wt.) | Petroleum resin | | | Tackiness of rubber blend (g.) |
| --- | --- | --- | --- | --- | --- |
| | | Yield (wt. percent) | Softening point (° C.) | Color index | |
| Example 3 | Ethylbenzene (13) | 46 | 100 | 11 | 1,000 |
| Reference Example 6. | With no petroleum resin incorporated | | | | 10 |

EXAMPLE 4–6; REFERENCE EXAMPLE 7–9

In the same flask as in Example 3 were placed 100 parts by weight of the same cracked oil as in said example and ethylbenzene in an amount as set forth in Table 4. While maintaining the temperature as indicated in said table 1.0 part by weight of aluminum chloride passing through a 150 Tyler mesh screen was added over 10 minutes followed by polymerization for 3 hours. Aftertreatment was conducted in the same way as in Example 3 to give a petroleum resin. The results are shown in Table 4.

EXAMPLES 7–9

Polymerization of cracked oil was carried out in the same way as in Example 3 except that a mixed solvent of ethylbenzene in an amount set forth in Table 5 was used and aftertreatment of the resulting polymerized oil similarly conducted to give a petroleum resin. The results are shown in Table 5.

TABLE 4

| | Ethylbenzene (parts by wt.) | Polymerization temperature (° C.) | Petroleum resin | | | Tackiness of rubber blend (g.) |
| --- | --- | --- | --- | --- | --- | --- |
| | | | Yield (wt. percent) | Softening point (° C.) | Color index | |
| Example: | | | | | | |
| 4 | 22 | 80 | 41 | 110 | 8 | 900 |
| 5 | 18 | 90 | 42 | 100 | 10 | 1,080 |
| 6 | 7 | 120 | 48 | 85 | 12 | 950 |
| Reference Example: | | | | | | |
| 7 | 42 | 80 | 41 | 85 | 8 | 500 |
| 8 | 37 | 90 | 42 | 78 | 9 | 450 |
| 9 | 31 | 120 | 49 | 66 | 12 | 350 |

TABLE 5

| | Mixed solvent | Wt. part | Petroleum resin | | | Tackiness of rubber blend (g.) |
| --- | --- | --- | --- | --- | --- | --- |
| | | | Yield (wt. percent) | Softening point (° C.) | Color index | |
| Example: | | | | | | |
| 7 | Ethylbenzene | 5 | 45 | 109 | 12 | 980 |
| | Benzene | 1 | | | | |
| 8 | Ethylbenzene | 5 | 43 | 106 | 13–14 | 970 |
| | Toluene | 1 | | | | |
| 9 | Ethylbenzene | 5 | 42 | 102 | 13–14 | 1,000 |
| | Xylene | 1 | | | | |

What is claimed is:

1. Process for preparing a petroleum resin product having a bromine number from about 20 to 40 which comprises polymerizing at a temperature from about 70° to 120° C. a hydrocarbon fraction substantially free of aromatic compounds, containing five carbon atoms boiling at a temperature of from 30° to 45° C. containing principally unsaturated hydrocarbons, in the presence of an aluminum chloride catalyst of a particle size such that it passes through a 100 Tyler mesh screen, the said catalyst being utilized in a weight percent of from about 0.5 to 3% based on the weight of the said hydrocarbon fraction in an aromatic hydrocarbon solvent selected from the group consisting of benzene, toluene, xylene and ethylbenzene, the solvent being utilized in an amount of from about 5 to 100 ml. per 100 grams of said hydrocarbon fraction.

2. Process according to claim 1 wherein the aluminum chloride catalyst is used in an amount from 0.8 to 1.5 parts by weight per 100 parts by weight of said $C_5$ hydrocarbon fraction.

3. Process according to claim 1 wherein the aromatic hydrocarbon solvent is benzene which is used in an amount from 30 to 100 ml. per 100 g. of said $C_5$ hydrocarbon fraction.

4. Process according to claim 1 wherein the aromatic hydrocarbon solvent is toluene which is used in an amount from 10 to 50 ml. per 100 g. of said $C_5$ hydrocarbon fraction.

5. Process according to claim 1 wherein the aromatic hydrocarbon solvent is xylene which is used in an amount from 5 to 30 ml. per 100 g. of said $C_5$ hydrocarbon fraction.

6. Process according to claim 1 wherein the aromatic hydrocarbon solvent is ethylbenzene which is used in an amount from 3 to 30% by weight of said $C_5$ hydrocarbon fraction.

7. Process according to claim 1 wherein the aromatic hydrocarbon solvent is ethylbenzene which is used in an amount from 5 to 25% by weight of said $C_5$ hydrocarbon fraction.

8. Process according to claim 1 wherein said $C_5$ hydrocarbon fraction is mainly composed of 1-pentene, 2-pentene, isoprene, 1,3-pentadiene and cyclopentadiene.

9. Process according to claim 8 wherein the cyclopentadiene is contained in a proportion less than 10% by weight of said $C_5$ hydrocarbon fraction.

10. Process according to claim 1 wherein the polymerization is conducted at a temperature from 90° to 115° C.

References Cited

UNITED STATES PATENTS 2,894,937   7/1959   Banes et al. _____ 260—82

HARRY WONG, Jr., Primary Examiner

U.S. Cl. X.R.

260—41.5 R, 79.5 B, 889